(12) United States Patent
Crawley (10) Patent No.: US 10,193,448 B1
(45) Date of Patent: Jan. 29, 2019

(54) METHOD OF FORMING A POWER SUPPLY CONTROL CIRCUIT AND STRUCTURE THEREFOR

(71) Applicant: SEMICONDUCTOR COMPONENTS INDUSTRIES, LLC, Phoenix, AZ (US)

(72) Inventor: Philip Crawley, Oceanside, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/935,840

(22) Filed: Mar. 26, 2018

(51) Int. Cl.
*H02M 3/158* (2006.01)
*H05B 33/08* (2006.01)

(52) U.S. Cl.
CPC ......... *H02M 3/158* (2013.01); *H05B 33/0815* (2013.01); *H05B 33/0827* (2013.01)

(58) Field of Classification Search
CPC ............... H02M 3/156; H02M 3/158; H02M 2003/156; H02M 2003/158; H05B 33/0815; H02B 33/0827
See application file for complete search history.

(56) References Cited

U.S. PATENT DOCUMENTS

| 4,307,331 | A | 12/1981 | Gyugyi | |
|---|---|---|---|---|
| 5,831,846 | A * | 11/1998 | Jiang | H02M 1/4208 363/125 |
| 7,777,459 | B2 | 8/2010 | Williams | |
| 8,817,501 | B1 | 8/2014 | Low et al. | |
| 9,270,170 | B2 * | 2/2016 | Divan | H02M 3/156 |
| 2004/0041620 | A1 | 3/2004 | D'Angelo et al. | |
| 2004/0251854 | A1 * | 12/2004 | Matsuda | H05B 33/0815 315/291 |
| 2010/0045248 | A1 * | 2/2010 | Hawley | G03B 15/03 323/282 |
| 2012/0170334 | A1 | 7/2012 | Menegoli et al. | |
| 2013/0154600 | A1 | 6/2013 | Giuliano | |
| 2013/0229841 | A1 | 9/2013 | Giuliano | |
| 2016/0079889 | A1 * | 3/2016 | Pietromonaco | H02K 11/22 318/400.3 |

* cited by examiner

*Primary Examiner* — Matthew Nguyen
(74) *Attorney, Agent, or Firm* — Robert F. Hightower (57) ABSTRACT

In one embodiment, a power supply control circuit may include a capacitive boost circuit having only three switches and only one boost capacitor. The capacitive boost circuit may be configured to receive an input voltage and form a first voltage to apply to an inductor. A control circuit of the power supply control circuit may be configured to switch an inductor switch at a first frequency to regulate the output voltage to the desired value, to switch the three switches at substantially the same frequency, and to adjust a duty cycle of the three switches.

20 Claims, 6 Drawing Sheets

METHOD OF FORMING A POWER SUPPLY CONTROL CIRCUIT AND STRUCTURE THEREFOR

BACKGROUND OF THE INVENTION

The present invention relates, in general, to electronics, and more particularly, to semiconductors, structures thereof, and methods of forming semiconductor devices.

In the past, the electronics industry utilized various methods and circuits to form boost type power supply controllers. In some embodiments, the efficiency of the system was controlled by the losses of the inductor and other passive elements utilized in the system. Some applications resulted in power lost within the elements with increasing frequency. Some applications also had power lost with increase voltage gain ratios or alternately with larger differences between the input and output voltages. The undesirable losses resulted in inefficient operation of the power supply that utilized the power supply controllers.

Accordingly, it is desirable to have a method of forming a power supply control circuit that increases operational efficiency of the system.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

The embodiments illustrated and described hereinafter suitably may have embodiments and/or may be practiced in the absence of any element which is not specifically disclosed herein.

DETAILED DESCRIPTION OF THE DRAWINGS

Figure 1:
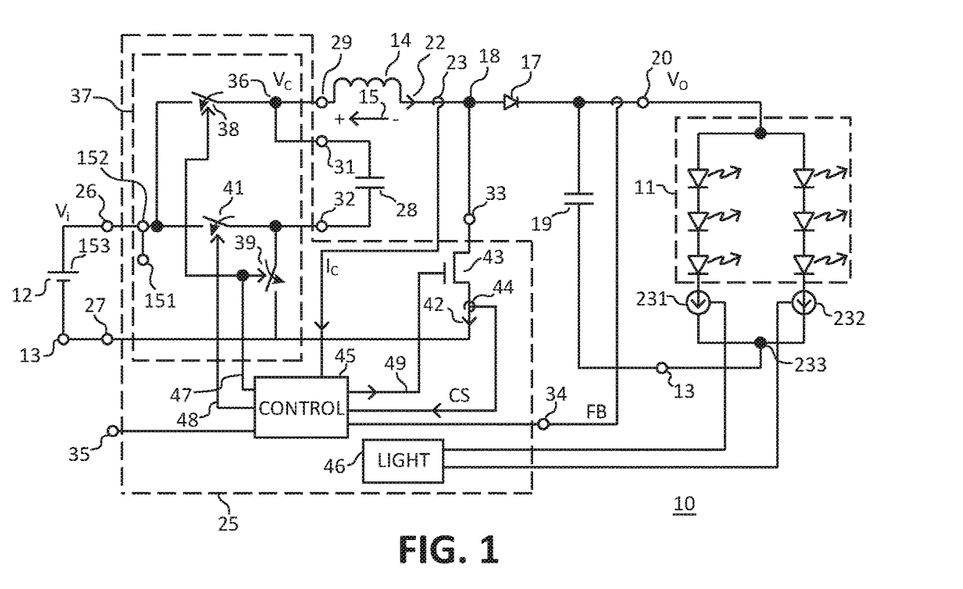
FIG. 1 schematically illustrates an example of an embodiment of a portion of a power supply control system that forms an output voltage to a load 11 in accordance with the present invention.

FIG. 1 schematically illustrates an example of an embodiment of a portion of a power supply control system 10 that receives an input voltage (Vi) from a voltage source 12 and provides an output voltage (Vo) to a load 11. System 10 includes an inductor 14 and a diode 17 to assist in forming the output voltage. In some embodiment, diode 17 may be replaced by a synchronous rectifier. A smoothing capacitor 19 may, in some embodiments, be connected in parallel with load 11 to assist in supplying power to load 11. In some embodiments, load 11 may be one or more strings of parallel connected LEDs. Load 11 may have other configurations in other embodiments, such as for example an R.F. radio transmitter, etc. In an example embodiment of load 11 being strings of LEDs, each string may optionally include an adjustable current source, such as for example optional adjustable current sources 231 and/or 232, that may be used to control the intensity or brightness of the light emitted by the LEDs.

A power supply controller or power supply control circuit 25 may be configured to regulate the operation of inductor 14 and control a value of an inductor current 22 that is supplied to load 11. For an example of load 11 being strings of LEDs, circuit 25 may optionally include a light control circuit or light circuit 46 that may be configured to control current sources 231 and 232. In other embodiments, circuit 46 may be external to circuit 25. Circuit 25 may have a voltage input 26 that may be configured to be connected to a terminal of source 12 and a common return terminal 27 that may be configured to be coupled to a common return terminal 13 of source 12. An output 29 of circuit 25 may be configured to be coupled to one terminal of inductor 14 and supply a voltage (Vc) to inductor 14. Circuit 25 may also include terminals 31 and 32 that are configured to be coupled to terminals of a boost capacitor 28. An embodiment may include that capacitor 28 may be formed within circuit 25. In some embodiments, terminal 31 may be omitted so that one terminal of capacitor 28 may be connected to output 29. An output 33 of circuit 25 may be configured to be coupled to a second terminal of inductor 14. A power switch or inductor switch, illustrated as a transistor 43, of circuit 25 may be coupled through output 33 to the second terminal of inductor 14 and may be used to control the value of current 22 through inductor 14. A switch current 42 may flow through transistor 43. In some embodiments, transistor 43 may be external to circuit 25. System 10 may have an alternate embodiment that may include a current sense circuit 23 that forms a current sense signal Ic to be representative of the value of current 22. A capacitor boost circuit 37 of circuit 25 may have an embodiment that may be configured to receive the input voltage (Vi) from source 12 and supply the voltage Vc to inductor 14. Circuit 37 may include a first switch 38, a second switch 39, and a third switch 41 that are all configured to be coupled to capacitor 28. A control circuit 45 may have an embodiment that may be configured to operate transistor 43 and to also operate switches 38, 39, and 41.

In an embodiment, circuit 45 may be configured to switch transistor 43 at a frequency to assist in forming current 22. Circuit 25 may be configured receive a feedback (FB) signal, on an input 34, that is representative of the value of the output voltage (Vo), and switch transistor 43 in order to regulate the value of the output voltage (Vo) to a desired value or target value. Those skilled in the art will appreciate that the output voltage is regulated to the desired value or target value within a range of values around the target value. For an example embodiment of load 11 being LEDs, the target value may be twenty volts (20v) and the range of values may be plus or minus five percent (5%) around the twenty volts. In another example, the output voltage Vo may be regulated to form a voltage at node 233 that is sufficient to keep current sources 231 and 232 operating. An embodiment of circuit 45 may be configured to form a drive signal or Ind. on-time drive signal 49 that operates transistor 43. Circuit 25, or alternately circuit 45, may also be configured to operate switches 38, 39, and 41 at the same frequency as transistor 43 to supply voltage Vc to inductor 14, such as for example at output 29. Circuit 45 may also be configured to form a control signal or Cap. on-time control signal 47 that operates switches 38 and 39, and to form a control signal or Cap. off-time control signal 48 that operates switch 41 such that switch 41 is operated substantially out-of-phase with and switches 38 and 39. An embodiment may include that switches 38 and 39 may only be closed or enabled during a time that switch 41 is open or disabled, and switch 41 may only be closed or enabled during a time that switches 38 and 39 are open or disabled. In an embodiment, circuit 45 may be configured to operate transistor 43 with a substantially fixed frequency and in a voltage mode control to control the value of output voltage Vo. Circuit 45 may also have an embodiment configured to operate switches 38, 39, and 41 with the same fixed frequency and with a substantially fixed duty cycle. Circuit 45 may be configured to operate transistor 43 and switches 38, 39, and 41 with a variable frequency in other embodiments and/or may have embodiments that operates switches 38, 39, and 41 with non-fixed duty cycles.

Figure 2:
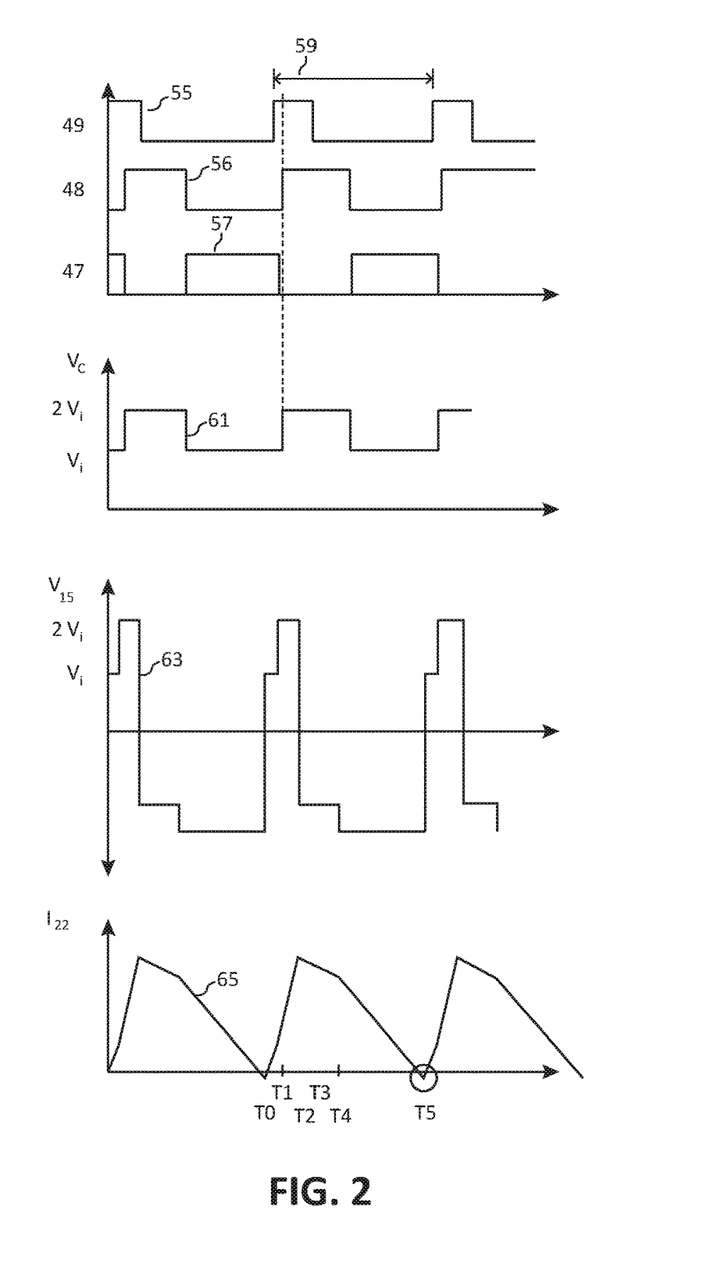
FIG. 2 is a graph illustrating some signals that may be formed during the operation of circuit of FIG. 1 in accordance with the present invention.

FIG. 2 is a graph illustrating some signals that may be formed during the operation of circuit 25. The abscissa illustrates time and the ordinate illustrates increasing value of the illustrated signals. A plot 55 illustrates drive Ind. on-time signal 49 to transistor 43, a plot 56 illustrates control Cap. off-time signal 48 to switch 41, and a plot 57 illustrates control Cap. on-time signal 47 to switches 38 and 39. A plot 61 illustrates the value of voltage Vc supplied to inductor 14. A plot 63 illustrates a voltage or inductor voltage 15 (V15) formed across inductor 14, and a plot 65 illustrates a value of current 22 (I22) that flows through inductor 14. This description has references to FIG. 1 and FIG. 2.

An embodiment of circuit 45 may be configured to operate or switch transistor 43 at a frequency having a period 59 as indicated by an arrow on plot 55. Circuit 45 may also operate or switch switches 41 and 38 and 39 at the same frequency and period. The duty cycle (DT) of circuit 37 is the total time of period 59 that Cap. off-tine signal 48 is asserted, thus that switch 41 is closed, divided by the total time of period 59. In some embodiments, switch 41 may be closed for more than one time interval during a period of transistor 43. Cap. on-time signal 47, thus switches 38 and 39, are enabled for substantially a portion of period 59 that switch 41 is open, thus Cap. off-time signal 48 is negated, (minus some time to form the signals in a non-overlapping manner). Thus, a duty cycle of switches 38 and 39 is substantially one minus the duty cycle of circuit 37 (1-DT). In an embodiment, signals 47 and 48 are formed to have non-overlapping asserted times and having phases that are opposite.

Assume for example that just prior to a time T0, the system has been operating, that transistor 43 is disabled, control Cap. off-time signal 48 is negated such that switch 41 is open, and control Cap. on-time signal 47 is asserted such that switches 38 and 39 are enabled to charge capacitor 28 to Vi. Enabling switches 38 and 39 also directly couples inductor 14 to receive the input voltage Vin such as for example through switch 38. Current 22 may be flowing through inductor 14 from voltage Vc, but the value of current 22 is decreasing. At time T0 circuit 45 enables transistor 43 and current 22 begins increasing at a first increase rate as illustrated by plot 65. Current 42 through transistor 43 also increases. Also, voltage 15 (V15) across inductor 14 increases to approximately voltage Vc. Circuit 45 later disables switches 38 and 39 to terminate charging capacitor 28 and subsequently, at a time T1, circuit 45 enables switch 41 to connect capacitor 28 in series with Vi to increase the value of voltage Vc as illustrated by plot 61. The increased voltage Vc is applied to inductor 14 which causes current 22 to increase at a second increase rate that is greater than the first increase rate as illustrated by plot 65 beginning at time T1. Thus, during at least a portion of the time that transistor 43 is enabled, switch 48 is also enabled to form voltage Vc at the increased value.

Assume that at a time T3 the output voltage has reached the desired value and circuit 45 negates Ind. on-time signal 49 to disable transistor 43 as illustrated by plot 55 Disabling transistor 43 causes current 42 to begin decreasing. Disabling transistor 43 also causes current 22 to begin decreasing at a first decrease rate as illustrated by plot 65. However, the value of Vc remains high, at approximately the value of voltage Vi plus the voltage from capacitor 28, thus, current 22 continues to flow but is decreasing at the first decrease rate. At a time T4, circuit 45 disables Cap. off-time signal 48 to open switch 41 and just after T4 asserts Cap. on-time signal 47 to enable switches 38 and 38, thus, the value of Vc decreases to approximately Vi as illustrated by plot 61. The decreased value of Vc decreases the rate of current 22 to a second decrease rate as illustrated by plot 65 after time T4.

In some embodiments, current 22 may continue to decrease and may go negative for a portion of period 59 such as illustrated just prior to or during a time T5. During the portion of period 59 that current 22 is negative, power is recovered from capacitor 19 (FIG. 1) because the voltage on capacitor 19 is greater than voltage Vi, thereby assisting to increase efficiency. At time T5, circuit 45 again asserts Ind. on-time signal 49 to enable transistor 43, and the cycle repeats. The sequence illustrated by times T1 to T5 continue to repeat.

It has been found that an unexpected result occurs from the operation of circuit 25, or alternately circuit 45. For example, configuring circuit 25 to control current 22, during a period of transistor 43, to have more than one increase rate, or alternately more than one decrease rate or alternately both, provides an unexpected result of increasing the efficiency that power is delivered from source 12 to load 11. The increased value of voltage Vc for at least a portion of a period of transistor 43 allows changing the rate at which the average value of current 22 accumulates during a period of transistor 43 thereby providing an unexpected result of increasing the efficiency. For example, the average value of current 22 may accumulate at a first rate in response to the first increase rate of current 22 and may accumulate at a second rate in response to the second increase rate of current 22, and similarly may accumulate at two different rates in response to the two different decrease rates. The two rates result in inductor 14 drawing current from Vin instead of from capacitor 28 for a longer portion of a cycle of transistor 43. Configuring circuit 25 to draw more of current 22 from Vin to charge inductor 14 instead of from capacitor 28 increases the efficiency. This is different than what one skilled in the art would expect. An embodiment of circuit 25 may be configured to increase the value of voltage Vc for a portion of time that transistor 43 is enabled which may assist in increasing the efficiency. In an embodiment, the total average value of current 22 for a period of transistor 43 may be decreased which increases the efficiency. Decreasing the total average value of current 22, for a period of transistor 43, allows reducing the frequency of operating transistor 43 to deliver a set amount of power to load 11 thereby also increasing the efficiency. The different increase rates or alternately different decrease rates of current 22 allow circuit 25 to increase the efficiency of delivering power from source 12 to load 11. Those skilled in the art will appreciate that a change in the duty cycle of circuit 37 allows changing the relationship between the enabled time of transistor 43 and the increased value of voltage Vc thereby changing the efficiency.

In order to facilitate the foregoing operation, a first terminal of switch 38 is commonly connected to a first terminal of switch 41 and to input 26 to receive the input voltage Vi. A second terminal of switch 38 is commonly connected to output 29 and to terminal 31 to be configured for connecting to a first terminal of capacitor 28. A second terminal of switch 41 is commonly connected to a first terminal of switch 39 and to terminal 32 to be configured for connecting to a second terminal of capacitor 28. A second terminal of switch 39 is connected to terminal 27. A control input of switches 38 and 39 are connected an output of circuit 45 to receive Cap. on-time signal 47. A control input of switch 41 is connected to another output of circuit 45 to receive Cap. off-tine signal 48. Another output of circuit 45 is connected to a gate of transistor 43 to apply Ind. on-time signal 49 to the gate. A source of transistor 43 is connected to terminal 27, and a drain of transistor 43 is connected to output 33 to be configured to connecting to the second terminal of inductor 14. An FB input 34 of circuit 45 is connected to input 34 to receive the FB signal.

Figure 3:
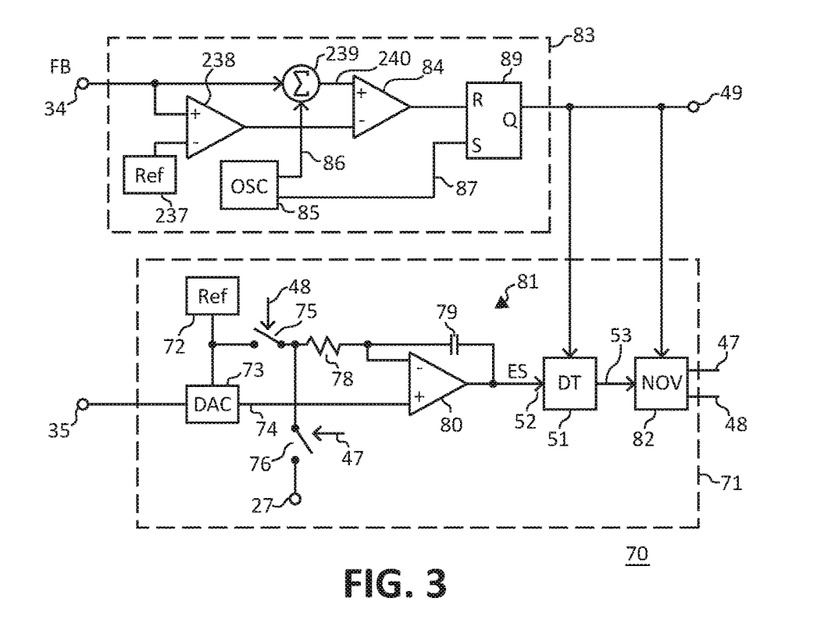
FIG. 3 schematically illustrates an example of a portion of an embodiment of a control circuit that may have an embodiment that may be an alternate embodiment of at least a portion of the circuit of FIG. 1 in accordance with the present invention.

FIG. 3 schematically illustrates an example of a portion of an embodiment of a control circuit 70 that may have an embodiment that may be an alternate embodiment of circuit 45. Circuit 70 includes an inductor control circuit 83 that is configured to form Ind. on-time drive signal 49 to operate transistor 43, and a duty cycle control circuit 71 that is configured to control the duty cycle of circuit 37 or alternately of switch 41.

In an embodiment, circuit 83 may be configured to operate as a voltage mode control circuit. In other embodiments, circuit 83 may be configured to operate as a current mode control or as a dual voltage and current mode control circuit. Although circuit 83 is illustrated as a leading edge control circuit, it may be a trailing edge control circuit in other embodiments. An embodiment of circuit 83 may include an oscillator 85 that is configured to form a clock signal 87 and a ramp signal 86 that has a frequency that is substantially the same as signal 87 and is reset with either a rising or falling edge of signal 87. Circuit 83 also includes a PWM comparator 84 and a PWM latch 89. Clock signal 87 sets latch 89 to assert Ind. on-time signal 49, such as for example as is illustrated by plot 55 at time T0. An embodiment may include that signal 87 may switch at the frequency of circuit 25. Ind. on-time signal 49 remains asserted until the feedback signal increases sufficiently to force the output of comparator 84 high and reset latch 89, such as for example as is illustrated by plot 55 at time T2. In an example embodiment, circuit 83 may include a reference generator circuit or Ref. 237, an error amplifier 238, and a summing circuit 239. Ref. 237, amplifier 238, and circuit 239 may be configured to form an adjusted FB signal 240 that is representative of the FB signal and is used to reset latch 89 and negate Ind. on-time signal 49. Those skilled in the art will appreciate that in other embodiments, some or all of Ref. 237, amplifier 238, and circuit 239 may be omitted and other combinations of the FB signal may be used to reset latch 89.

Circuit 71 is configured to form the duty cycle of circuit 37, or alternately switch 41, to be substantially fixed at a value in response to a signal received on an Cap. control input 35 of circuit 70. A digital-to-analog converter (DAC) circuit 73 of circuit 71 receives a digital word on Cap. control input 35 and converts the digital word to an analog signal 74 that is representative of the desired duty cycle for switch 41 or alternately for circuit 37. The digital word may, in an embodiment, represent the percentage of period 59 that switch 41 will be enabled or closed. Circuit 73 receives a reference voltage from a reference generator of Ref. 72. In other embodiments, the signal on Cap. control input 35 may be analog and circuit 73 may be omitted. Switches 75 and 76 receive respective control signals 48 and 47 and form a signal at an inverting input of an amplifier 80 that is proportional to the duty cycle of switch 41. Amplifier 80 is a portion of an integrator 81 that may integrate the value of the received signal from switches 75 and 76. For example, as the duty cycle of switch 41 increases, the value of the signal at the inverting input of amplifier 80 increases, and vice versa. Amplifier 80 forms an error signal (ES) on an output of amplifier 80 that is representative of the difference between the desired value of the duty cycle of switch 41, thus Cap. off-time signal 48, and the actual value.

A duty cycle adjustment circuit 51 receives the error signal (ES) on an input 52 and forms a duty cycle Cap. clock 53 on an output of circuit 51. Cap. Clock 53 switches at the frequency of transistor 43. Circuit 51 either increases or decreases the duty cycle of Cap. clock 53 responsively to the value of the error signal. A non-overlapping (NOV) circuit 82 receives Cap. clock 53 and forms non-overlapping control signals 47 and 48. In one embodiment, the duty cycle of Cap. off-time signal 48 may be substantially the same as the duty cycle of Cap. clock 53. Circuit 70 allows the duty cycle of circuit 37 to be adjusted by a user of circuit 25 with components external to circuit 25, such as for example the signal received on Cap. control input 35. Thus, the duty cycle can be adjusted to a value and optimized to provide the best efficiency for the operation of circuit 25 for the value of the inductor that is used for inductor 14 and the value of the capacitor that is used for capacitor 28. Those skilled in the art will appreciate that the optimum efficiency may vary depending on the value and types of inductor 14 and capacitor 28.

Referring back to FIG. 2, those skilled in the art will appreciate that changing the duty cycle of switch 41, thus circuit 37, may change the position within period 59, relative to Ind. on-time signal 49, that Cap. off-time signal 48 is asserted to close switch 41 and also may change the position, relative to Ind. on-time signal 49, that Cap. on-time signal 47 is asserted to close switches 38 and 39. Thus, the timing relationships, or alternately the positions relative to each other, between Ind. on-time signal 49 and signals 47 and 48 illustrated in FIG. 2 are for one particular duty cycle of Cap. off-time signal 48, thus switch 41, and the relationships thereto may change for other duty cycles of circuit 37.

In order to facilitate the above features, the non-inverting input of comparator 84 is connected to input 34 and an output of comparator 84 is connected to a reset input of latch 89. An inverting input of comparator 84 is connected to receive ramp signal 86 from oscillator 85. A set input of latch 89 is connected to receive clock signal 87 from oscillator 85. A Q output of latch 89 is commonly connected to form Ind. on-time signal 49, to an input of circuit 51, and to an input of circuit 82. An input of circuit 73 is connected to receive the signal on Cap. control input 35. Circuit 73 has an input connected to an output of Ref. 72 and to a first terminal of switch 75. An output of circuit 73 is configured to form signal 74 and connected to a non-inverting input of amplifier 80. An inverting input of amplifier 80 is commonly connected to a first terminal of a capacitor 79 and a first terminal of a resistor 78. A second terminal of resistor 78 is commonly connected to a second terminal of switch 75 and a first terminal of switch 76. A second terminal of switch 76 is connected to terminal 27. A control input of switch 76 is connected to receive Cap. on-time signal 47 and a control input of switch 75 is connected to receive control Cap. off-time signal 48. An output of amplifier 80 is commonly connected to a second terminal of capacitor 79 and input 52 of circuit 51. The output of circuit 51 is connected to an input of circuit 82. A first output of circuit 82 is configured to form Cap. on-time signal 48 and a second output is configured to form Cap. off-time signal 48.

Figure 4:
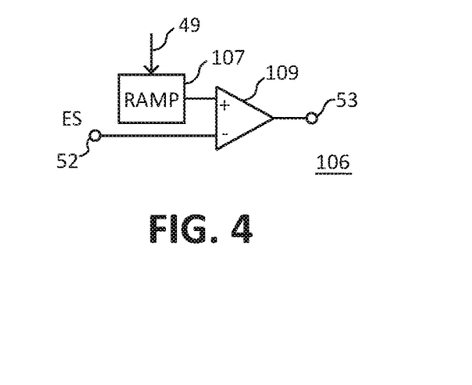
FIG. 4 schematically illustrates an example of a portion of an embodiment of a duty cycle adjustment circuit that may be an alternate embodiment of a portion of the circuit of FIG. 1 or 3 in accordance with the present invention.

FIG. 4 schematically illustrates an example of a portion of an embodiment of a duty cycle adjustment circuit 106 that may be an alternate embodiment of circuit 51 (FIG. 3). Circuit 106 includes a ramp generator circuit 107 that is synchronous to drive Ind. on-time signal 49. In an embodiment, circuit 107 may initiate generation of the ramp signal in response to the rising edge of Ind. on-time signal 49. A comparator 109 compares the error signal received on input 52 to the ramp signal and forms duty cycle Cap. clock 53 on an output of comparator 109.

In an embodiment of circuit 106, an inverting input of comparator 109 is connected to input 52. A non-inverting input of comparator 109 is connected to a ramp output of ramp circuit 107. An input of circuit 107 is connected to receive Ind. on-time signal 49. An output of comparator 109 is connected to the output of circuit 51.

Figure 5:
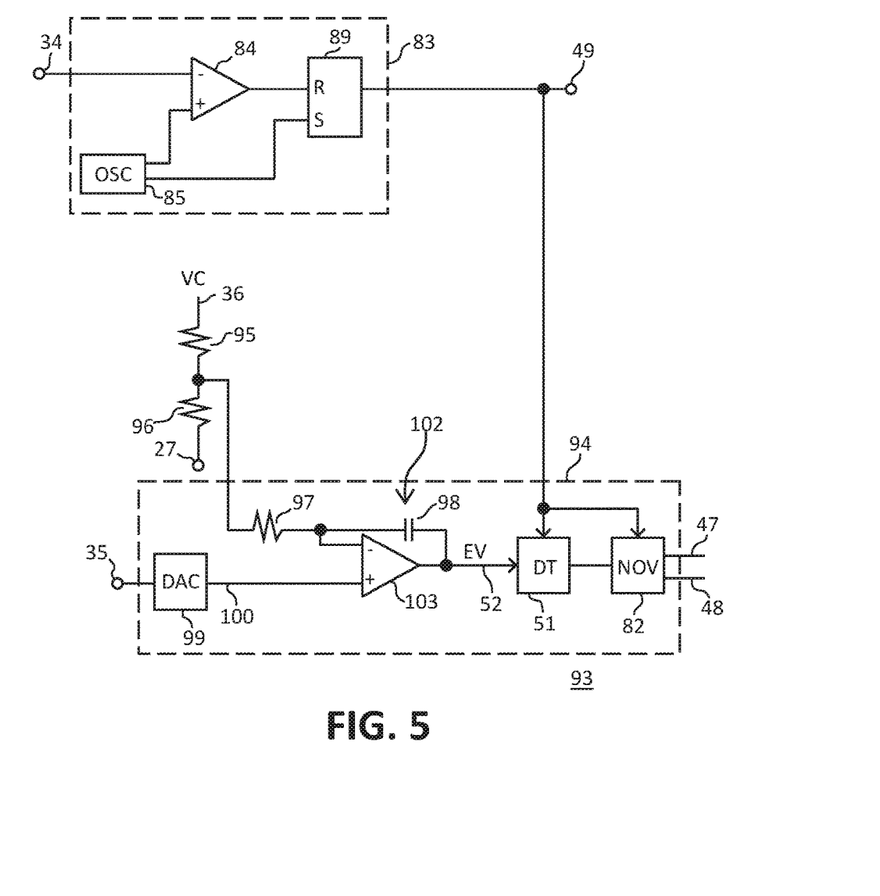
FIG. 5 schematically illustrates an example of a portion of an embodiment of a control circuit that may have an embodiment that may be an alternate embodiment of a portion of the circuit of FIG. 1 or 3 in accordance with the present invention.

FIG. 5 schematically illustrates an example of a portion of an embodiment of a control circuit 93 that may have an embodiment that may be an alternate embodiment of a portion of circuit 45 or alternatively of circuit 70 (FIG. 3). Circuit 93 includes a duty cycle control circuit 94 that may be an alternate embodiment of a portion of circuit 45 (FIG. 1) or of circuit 71 (FIG. 3). An embodiment of circuit 93 may be configured to adjust the duty cycle (DT) of circuit 37, or switch 41, to form the Vc voltage with a substantially constant peak value that is controlled in response to a signal received from external to circuit 25.

Circuit 93 may be configured to form the duty cycle (DT) at a value in response to a signal received on Cap. control input 35 of circuit 93. Circuit 93 receives a digital word on Cap. control input 35 and converts the digital word to an analog signal 100 that is representative of the desired value of voltage Vc. An integrator 102 receives a signal that is representative of voltage Vc, such as for example from a resistor divider of resistors 95 and 96. Integrator 102 also receives the analog signal 100 representing the desired value of voltage Vc and forms an error signal (EV) that is representative of a difference between the desired value and actual value of voltage Vc. Circuit 51 receives the error signal (EV) and adjust the duty cycle (DT) of Cap. off-time signal 48, thus of circuit 37, to maintain the value of voltage Vc to be substantially constant. For example, as the value of voltage Vc decreases, the EV signal increases which increase the duty cycle (DT) of switch 41 and circuit 37 to increase the value of voltage Vc.

An embodiment of circuit 94 may include that an input of circuit 99 may be connected to Cap. control input 35 and an output of circuit 99 may be configured to form signal 100 and connected to a non-inverting input of an amplifier 103. An inverting input of amplifier 103 may be commonly connected to a first terminal of a resistor 97 and a first terminal of a capacitor 98. A second terminal of resistor 97 may be commonly connected to a first terminal of resistor 95 and a first terminal of resistor 96. A second terminal of resistor 95 may be connected to a node 36. A second terminal of resistor 96 may be connected to terminal 27. A second terminal of capacitor 98 may be commonly connected to an output of amplifier 103 and to input 52 of circuit 51.

Figure 6:
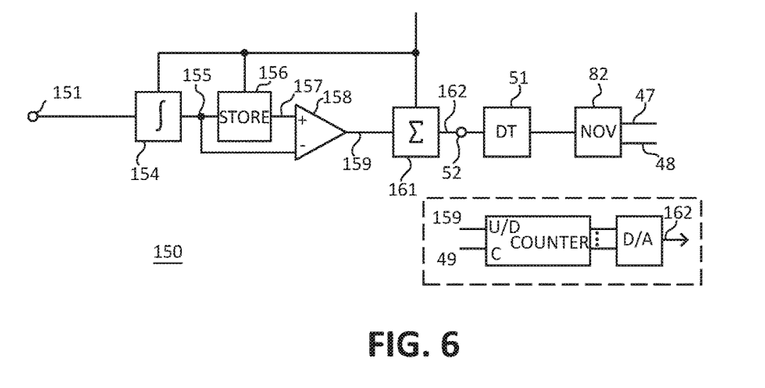
FIG. 6 schematically illustrates an example of a portion of an embodiment of a duty cycle control circuit that may be an alternate embodiment of any one of the circuit of FIG. 1, 3, 5, or 7 in accordance with the present invention.

FIG. 6 schematically illustrates an example of a portion of an embodiment of a duty cycle control circuit 150 that may be an alternate embodiment of a portion of circuit 45, or an alternate embodiment of any one of circuits 71 (FIG. 3), or 94 (FIG. 5), or a circuit 145 (FIG. 7) which is explained further hereinafter. An embodiment of circuit 150 may be configured to adjust a duty cycle (DT) of circuit 37 so that a value of a current 153 (FIG. 1) supplied by source 12 during a period of transistor 43 is no greater than the value of current 153 during a previous period of transistor 43. Circuit 150 may have an embodiment that includes adjusting the duty cycle (DT) for a current period of transistor 43 so that the value of current 153 for the current period is no greater than the value from an immediately previous period of transistor 43. An embodiment of circuit 150 includes an input connected to receive a current sense signal 151 from a current sense circuit 152 (FIG. 1) that is representative of the value of current 153. Circuit 150 may include an integrator circuit 154 that integrates the value of current 153 over a period of transistor 43 and forms a signal 155 that is representative of the total current delivered by current 153 during that particular period of transistor 43. An embodiment may include that circuit 154 forms signal 155 to represent the total charge delivered by current 153. A storage circuit 156 may be configured to store the value of current 153, or the signal representing the value. Circuit 156 may have an embodiment that may be configured to store the value of signal 155 at the end of the period of transistor 43. An embodiment of circuit 156 may be a capacitor configured to be switched to signal 155 by a switch in response to Ind. on-time signal 49. A comparator 158 may be configured to compare the stored value representing the value of current 153 during a previous period and signal 155 representing the value during a current period and form a signal 159 having an asserted value if current 153 were greater in the current period than in the previous period and negated if current 153 were less in the current period than in the previous period. A summing circuit 161 may be configured to sum the value of signal 159 over a plurality of periods of transistor 43 and form an error signal 162 that represents how much current 153 has increased or decreased from a previous value. An embodiment of circuit 150 may apply signal 162 to input 52 of circuit 51. Thus, circuit 150 changes the duty cycle of circuit 37 to minimize the current supplied by source 12, thereby improving the efficiency of system 10.

For example, in one embodiment load 11 may be one or more strings of LEDs. In such an embodiment, the steady state operation of the system would have supply a substantially constant current to load 11. If there were a minor change in load 11 or in environmental conditions, it would be advantageous to minimize any change in current 153 for such a change.

As is illustrated in the dashed box of FIG. 6, an embodiment of circuit 161 may include a digital counter that counts either up or down, responsively to the asserted or negated state of signal 159, for each period of transistor 43. The digital word formed by the counter can be received by a digital-to-analog converter to form signal 162. In other embodiments, comparator 158 and circuit 161 may be analog circuit.

Figure 7:
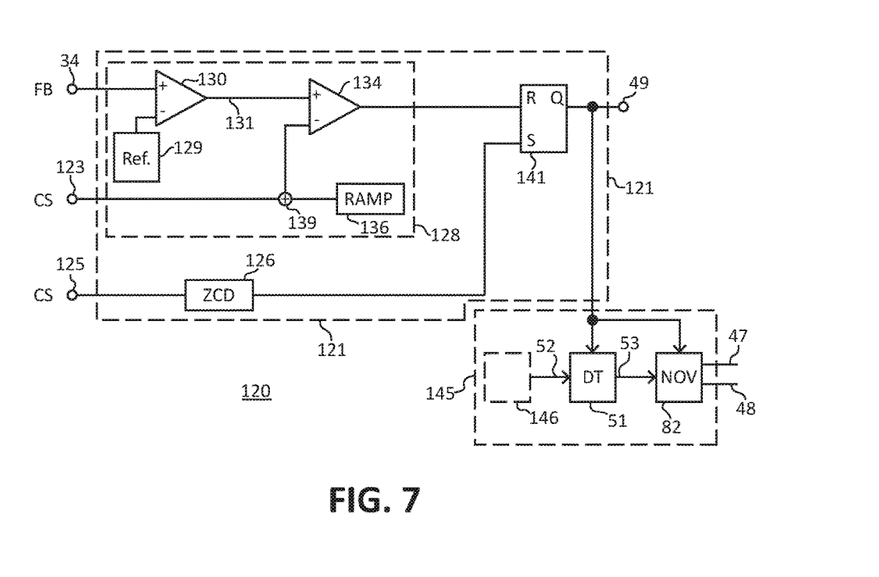
FIG. 7 schematically illustrates an example of a portion of an embodiment of a control circuit that may have an embodiment that may be an alternate embodiment of a portion of the circuit of FIG. 1 or 3-6 in accordance with the present invention.

FIG. 7 schematically illustrates an example of a portion of an embodiment of a control circuit 120 that may have an embodiment that may be an alternate embodiment of a portion of circuit 45 or of circuit 70 or of circuit 93. Circuit 120 includes an inductor control circuit 121 and a duty cycle control circuit 145. Circuit 145 may be any one of circuits 71 or 94 or circuit 150.

An embodiment of circuit 121 is configured to control transistor 43 to operate circuit 25 or alternately system 10 (FIG. 1) in a quasi-resonant operating mode. In an embodiment of the quasi-resonant operating mode, transistor 43 may be enabled in response to current 22 becoming zero or substantially zero during a period of transistor 43, and transistor 43 is disabled in response the peak value of current 42 through transistor 43 reaching a desired value. Thus, the frequency at which transistor 43 is switched may vary depending on the operation of load 11 (FIG. 1). The frequency of switches 38, 39, and 41 is the substantially the same as transistor 43. Circuit 121 includes a PWM latch 141, a zero crossing detection (ZCD) circuit 126 that is configured to detect a zero crossing of current 22 (FIG. 1), and a peak current control circuit 128 that controls the peak value of current 42 through transistor 43. Circuit 128 is configured to receive the feedback (FB) signal from input 34, a current sense (CS) signal from a current sense circuit 44 (FIG. 1) that is representative of the value of current 42. Circuit 126 may, in an embodiment, also be configured to receive an inductor current sense (Ic) signal that is representative of the value of current 22, and detect when the value of current 22 is substantially zero or alternately near zero, and responsively set latch 141 to assert Ind. on-time signal 49 and enable transistor 43. Circuit 128 is configured to receive the current sense (CS) signal and the feedback (FB) signal and reset latch 141, thus negate signal 149 and disable transistor 43, in response to the peak value of current 42.

In order to facilitate the foregoing operation, a first input of circuit 121 is connected to receive the FB signal and connected to a non-inverting input of amplifier 130 which has an inverting input connected to receive a reference voltage from a reference generator or Ref 129. An output 131 of amplifier 130 is connected to a non-inverting input of a comparator 134 which has an output connected to a reset input of latch 141. An inverting input of comparator 134 is connected to an output of a summing circuit 139. A first input of circuit 139 is connected to an output of a ramp circuit 136 to receive a ramp signal, and a second input of circuit 139 is connected to an input 123 of circuit 121 to receive the CS signal. Circuit 139 may have an embodiment that is configured to add the ramp signal to the CS signal. A Q output of latch 141 is configured to form Ind. on-time signal 49 and also connected to an input of ramp circuit 136 and to an input of circuit 145.

Figure 8:
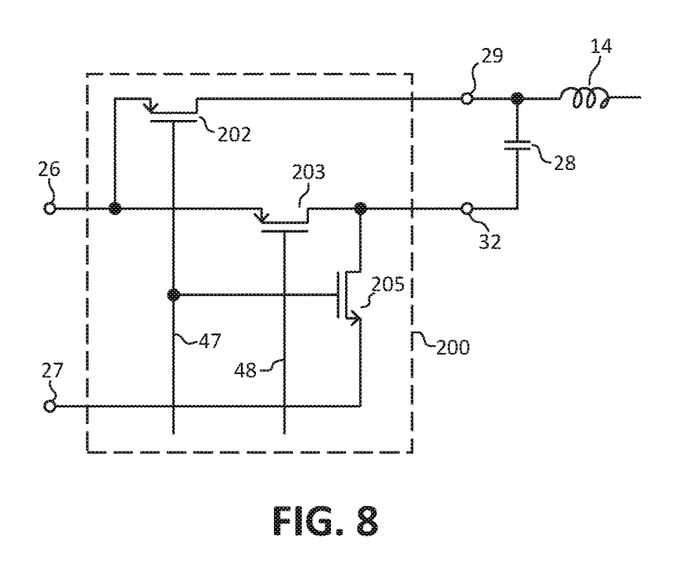
FIG. 8 schematically illustrates an example of a portion of an embodiment of a capacitor boost circuit that may have an embodiment that may be an alternate embodiment of any of the circuits of FIG. 1 or 3-7 in accordance with the present invention.

FIG. 8 schematically illustrates an example of a portion of an embodiment of a capacitor boost circuit 200 that may have an embodiment that may be an alternate embodiment of circuit 37 (FIG. 1). Circuit 200 includes a P-channel MOS transistor 202 that is configured to operate similarly to switch 38 of circuit 37. A P-channel MOS transistor 203 of circuit 200 is configured to operate similarly to switch 41 of circuit 37. An in channel MOS transistor 205 is configured to operate similarly to switch 39 of circuit 37. Transistor 202 has a source commonly connected to input 26 and to a source of transistor 203. A drain of transistor 202 is connected to output 29 and configured to be connected to a terminal of inductor 14 and a terminal of capacitor 28. A drain of transistor 203 is commonly connected to a drain of transistor 205 and to terminal 32. A source of transistor 205 is connected to terminal 27. A gate of transistor 205 is commonly connected to a gate of transistor 202 and to receive Cap. on-time signal 47. A gate of transistor 203 is connected to receive Cap. off-time signal 48.

Figure 9:
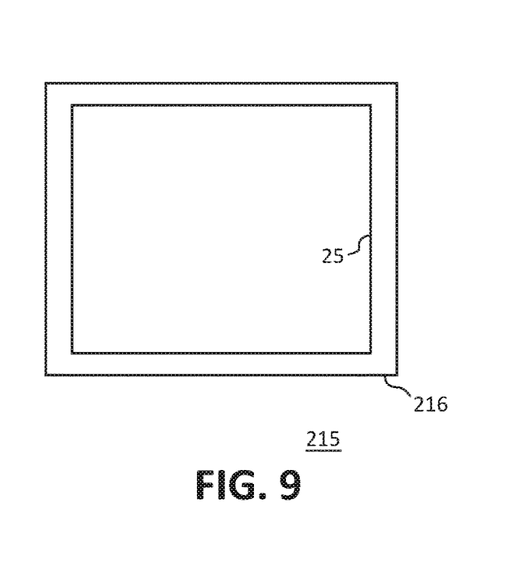
FIG. 9 illustrates an enlarged plan view of a semiconductor device that includes at least some of the circuits of at least FIG. 1 in accordance with the present invention.

FIG. 9 illustrates an enlarged plan view of a portion of an embodiment of a semiconductor device or integrated circuit 215 that is formed on a semiconductor die 216. In an embodiment, circuit 25 and any one of circuits 70, 93, 150, or 120 may be formed on die 216. Die 216 may also include other circuits that are not shown in FIG. 9 for simplicity of the drawing. The circuits and device or integrated circuit 215 may be formed on die 216 by semiconductor manufacturing techniques that are well known to those skilled in the art.

From all the foregoing, one skilled in the art will understand that an embodiment of a circuit for a power supply control system comprising:

a control circuit, such as for example circuit 45, configured to operate a power switch, such as for example switch 43, at a frequency having a period to control a current, such as for example current 22, through an inductor, such as for example inductor 14, and through the power switch to provide an output voltage to a load wherein the control circuit operates the power switch at a frequency having a period;

a first switch, such as for example switch 38, having a first terminal, a second terminal, and a control terminal, the first terminal of the first switch configured to be coupled to a first terminal of the inductor and to a first terminal of a boost capacitor, such as for example capacitor 28, the second terminal of the first switch configured to be coupled to a first terminal of a power source, such as for example source 12;

a second switch, such as for example switch 39, having a first terminal, a second terminal, and a control terminal, the first terminal of the second switch configured to be coupled to a second terminal of the boost capacitor, the second terminal of the second switch configured to be coupled to a second terminal of the power source, wherein the control circuit operates the first and second switches at the frequency and enables the first and second switches for substantially a first portion of the period; and a third switch, such as for example switch 41 having a first terminal, a second terminal, and a control terminal, the first terminal of the third switch coupled to the first terminal of the second switch, the second terminal of the third switch coupled to the first terminal of the first switch, wherein the control circuit operates the third switch at the frequency and operates the third switch with a substantially opposite phase to the first switch.

In an alternate embodiment, the control terminal of the third switch may be enabled to close the third switch at least a portion of a time that the first switch is closed.

Another embodiment may include that the control circuit is configured to adjust a duty cycle of the first, second, and third switches independently of the output voltage.

An embodiment may include that the control circuit is configured to operate the first switch, the second switch, the third switch, and the power switch.

In an embodiment, the first terminal of the power switch may be configured to be coupled to a second terminal of the inductor, the second terminal of the power switch configured to be coupled to the second terminal of the power source, and the control terminal of the power switch is configured to be operated by the control circuit.

An embodiment may include that the power switch is an MOS transistor.

Another embodiment may include that the control circuit may be configured to adjust a duty cycle of the first, second, and third switches to maintain a substantially fixed voltage at the first terminal of the inductor.

In an embodiment, the control circuit may be configured to adjust a duty cycle of the first, second, and third switches so that a value of current flow from the power source during a first period of the frequency is substantially no greater than an immediately preceding period'.

An embodiment may include that the control circuit may be configured to form the frequency to be substantially fixed and to form a duty cycle of the first, second, and third switches to be substantially fixed at a first duty cycle in response to a value of an external control signal.

The circuit may have an embodiment wherein the control circuit may be configured to adjust the frequency and a duty cycle of the power switch to vary in response to a value of the load.

Those skilled in the art will understand that an embodiment of a method of forming a power supply control circuit may comprise:

forming a capacitive boost circuit, such as for example circuit 37, with only three switches configured to be coupled to only one boost capacitor wherein the capacitive boost circuit is configured to receive an input voltage from a voltage source and form a first voltage to apply to a first terminal of an inductor;

forming an inductor switching circuit with a power switch that is configured to switch a second terminal of the inductor at a frequency to form an output voltage for a load wherein a first duty cycle of the power switch is formed responsively to a value of the output voltage second; and forming a control circuit to switch the three switches at the frequency wherein the control circuit is configured to form a second duty cycle of a first switch of the three switches to be different from a third duty cycle of a second switch of the three switches wherein the control circuit is configured to form the second duty cycle and the third duty cycle independently of a value of the output voltage.

The method may also have an embodiment that may include configuring the control circuit to adjust the second duty cycle and the third duty cycle responsively to an input current received from the voltage source.

An embodiment of the method may include configuring the control circuit to adjust the second duty cycle and the third duty cycle so that an input current received from the voltage source for a first cycle of the frequency is substantially no greater than for an immediately previous cycle of the frequency.

Another embodiment may also include configuring the inductor switching circuit to operate in a quasi-resonant mode.

An embodiment may include configuring the control circuit to adjust the second duty cycle and third duty cycle so that a peak value of the first voltage is substantially constant for two or more cycles of the frequency for variations of the input voltage.

Those skilled in the art will also appreciate that an embodiment of a circuit for a power supply control system may comprise:

a power switch configured to be coupled to a first terminal of an inductor and control current flow through the inductor and regulate an output voltage to a desired value;

a capacitive boost circuit having only three switches and only one boost capacitor, the capacitive boost circuit configured to receive an input voltage and form a first voltage to apply to a second terminal of the inductor; and a control circuit configured to switch the power switch at a first frequency to regulate the output voltage to the desired value, the control circuit configured to switch the three switches at substantially the frequency and to adjust a duty cycle of the three switches.

In another embodiment, the control circuit may be configured to form a duty cycle of the power switch responsively to a value of the output voltage and to adjust the duty cycle of the three switches independently of the value of the output voltage.

An embodiment may include that the control circuit may be configured to adjust the duty cycle of the three switches to form the first voltage to be substantially constant for a change in the input voltage.

In an embodiment, the control circuit may be configured to adjust the duty cycle of the three switches to form a current received from the input voltage for a first cycle of the first frequency to be no greater than a value from an immediately preceding cycle.

The control circuit may include an embodiment that may be configured to adjust the duty cycle of the three switches independently of a value of the output voltage.

In view of all of the above, it is evident that a novel device and method is disclosed. Forming the power supply control circuit to operate the switches of the capacitor boost control circuit at the same frequency as the inductor switch of the inductor control circuit facilitates controlling the relationship on-time of the inductor switch and the boosted value of the voltage applied to inductor in order to increase the operating efficiency. Forming the capacitor boost circuit to form the voltage to the inductor at a value greater than the input voltage during at least a portion of the on-time of the inductor switch during a period of the inductor switch increases the efficiency. Additionally, forming the power supply control circuit to form the inductor current at two rates of increase during the on-time of the inductor switch and to adjust the duration of the two different rates by adjusting the duty cycle of the capacitor boost circuit also increases the efficiency. Further, forming the power supply control circuit to form the inductor current at two different rates of decrease and to adjust the duration of the two different rates by adjusting the duty cycle of capacitor boost circuit also increases the efficiency.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of system 10 and circuits 45, 70, 93, 106, 150, and 120 are used as vehicles to explain the operation method of operating the inductor switch and the capacitor boost switches at the same frequency while varying the duty cycle of the capacitor boost switches relative to the period of the inductor switch. Alternately, as a vehicle to explain operating the inductor switch and the capacitor boost switches at the same frequency while varying the boosted voltage applied to the inductor during a period of the inductor switch. Those skilled in the art will also appreciate that the example of using LEDs as a load for circuit 25 is just a vehicle to explain circuit 25 applying two different voltage to the inductor to improve efficiency or alternately to explain the circuit configured to form current 22 to have to different rates of rise time or alternately two different rates of fall time. Those skilled in the art will understand that any of the circuits or methods described herein may be used to form a filter circuit, such as a filter or compensation circuit for a power supply control loop, that may be substantially devoid of poles and zeros. For example, reduce or substantially eliminate poles and zeros from the filter.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A circuit for a power supply control system comprising:
a control circuit configured to operate a power switch at a frequency having a period to control a current through an inductor and through the power switch to provide an output voltage to a load wherein the control circuit operates the power switch at a frequency having a period;
a first switch having a first terminal, a second terminal, and a control terminal, the first terminal of the first switch configured to be coupled to a first terminal of the inductor and to a first terminal of a boost capacitor, the second terminal of the first switch configured to be coupled to a first terminal of a power source;
a second switch having a first terminal, a second terminal, and a control terminal, the first terminal of the second switch configured to be coupled to a second terminal of the boost capacitor, the second terminal of the second switch configured to be coupled to a second terminal of the power source, wherein the control circuit operates the first and second switches at the frequency and enables the first and second switches for substantially a first portion of the period; and
a third switch having a first terminal, a second terminal, and a control terminal, the first terminal of the third switch coupled to the first terminal of the second switch, the second terminal of the third switch coupled to the first terminal of the first switch, wherein the control circuit operates the third switch at the frequency and operates the third switch with a substantially opposite phase to the first switch.

2. The circuit of claim 1 wherein the control terminal of the third switch is enabled to close the third switch at least a portion of a time that the first switch is closed.

3. The circuit of claim 1 wherein the control circuit is configured to adjust a duty cycle of the first, second, and third switches independently of the output voltage.

4. The circuit of claim 1 wherein the control circuit is configured to operate the first switch, the second switch, the third switch, and the power switch.

5. The circuit of claim 1 wherein the first terminal of the power switch configured to be coupled to a second terminal of the inductor, the second terminal of the power switch configured to be coupled to the second terminal of the power source, and the control terminal of the power switch is configured to be operated by the control circuit.

6. The circuit of claim 1 the power switch is an MOS transistor.

7. The circuit of claim 1 wherein the control circuit is configured to adjust a duty cycle of the first, second, and third switches to maintain a substantially fixed voltage at the first terminal of the inductor.

8. The circuit of claim 1 wherein the control circuit is configured to adjust a duty cycle of the first, second, and third switches so that a value of current flow from the power source during a first period of the frequency is substantially no greater than an immediately preceding period'.

9. The circuit of claim 1 wherein the control circuit is configured to form the frequency to be substantially fixed and to form a duty cycle of the first, second, and third switches to be substantially fixed at a first duty cycle in response to a value of an external control signal.

10. The circuit of claim 1 wherein the control circuit is configured to adjust the frequency and a duty cycle of the power switch to vary in response to a value of the load.

11. A method of forming a power supply control circuit comprising:
 forming a capacitive boost circuit with only three switches configured to be coupled to only one boost capacitor wherein the capacitive boost circuit is configured to receive an input voltage from a voltage source and form a first voltage to apply to a first terminal of an inductor;
 forming an inductor switching circuit with a power switch that is configured to switch a second terminal of the inductor at a frequency to form an output voltage for a load wherein a first duty cycle of the power switch is formed responsively to a value of the output voltage; and
 forming a control circuit to switch the three switches at the frequency wherein the control circuit is configured to form a second duty cycle of a first switch of the three switches to be different from a third duty cycle of a second switch of the three switches wherein the control circuit is configured to form the second duty cycle and the third duty cycle independently of a value of the output voltage.

12. The method of claim 11 further including configuring the control circuit to adjust the second duty cycle and the third duty cycle responsively to an input current received from the voltage source.

13. The method of claim 11 further including configuring the control circuit to adjust the second duty cycle and the third duty cycle so that an input current received from the voltage source for a first cycle of the frequency is substantially no greater than for an immediately previous cycle of the frequency.

14. The method of claim 11 further including configuring the inductor switching circuit to operate in a quasi-resonant mode.

15. The method of claim 11 further including configuring the control circuit to adjust the second duty cycle and third duty cycle so that a peak value of the first voltage is substantially constant for two or more cycles of the frequency for variations of the input voltage.

16. A circuit for a power supply control system comprising:
 a power switch configured to be coupled to a first terminal of an inductor and control current flow through the inductor and regulate an output voltage to a desired value;
 a capacitive boost circuit having only three switches and only one boost capacitor, the capacitive boost circuit configured to receive an input voltage and form a first voltage to apply to a second terminal of the inductor; and
 a control circuit configured to switch the power switch at a first frequency to regulate the output voltage to the desired value, the control circuit configured to switch the three switches at substantially the first frequency and to adjust a duty cycle of the three switches.

17. The circuit of claim 16 wherein the control circuit is configured to form a duty cycle of the power switch responsively to a value of the output voltage and to adjust the duty cycle of the three switches independently of the value of the output voltage.

18. The circuit of claim 16 wherein the control circuit is configured to adjust the duty cycle of the three switches to form the first voltage to be substantially constant for a change in the input voltage.

19. The circuit of claim 16 wherein the control circuit is configured to adjust the duty cycle of the three switches to form a current received from the input voltage for a first cycle of the first frequency to be no greater than a value from an immediately preceding cycle.

20. The circuit of claim 16 wherein the control circuit is configured to adjust the duty cycle of the three switches independently of a value of the output voltage.

* * * * *